Oct. 21, 1941.                J. B. MEEK                2,260,149
                CONTAINER AND METHOD OF MAKING SAME
                       Filed Jan. 22, 1940            2 Sheets-Sheet 1

INVENTOR:
JOHN B. MEEK
BY Geo. B. Pitts
ATTORNEY

Oct. 21, 1941.  J. B. MEEK  2,260,149
CONTAINER AND METHOD OF MAKING SAME
Filed Jan. 22, 1940  2 Sheets-Sheet 2

INVENTOR:
JOHN B. MEEK
BY Geo. B. Witte
ATTORNEY.

Patented Oct. 21, 1941

2,260,149

UNITED STATES PATENT OFFICE 2,260,149

CONTAINER AND METHOD OF MAKING SAME

John B. Meek, Cleveland, Ohio, assignor to The Buckeye Forging Company, Cleveland, Ohio, a corporation of Ohio Application January 22, 1940, Serial No. 314,974

3 Claims. (Cl. 29—148.2)

This invention relates to a bushing and mounting thereof in the wall of a container or tank. Because of its sealing characteristic, the invention is particularly adapted for use in the walls of tanks for liquids or gases under pressure, for example, storage tanks for water connected with the city water supply. In many instances, tanks of this type (usually termed boilers) are connected to and form part of a service system and are provided directly or indirectly with heating means, so that the internal pressure of the water, due to heating, is increased from time to time above that of city water when cold; and since the pressure rises when the water is hot and lowers when the hot water is drawn off and replaced by cold water from the city mains, there is, on all portions of the tank walls and fittings therefor, alternate expansion and contraction stresses. While these stresses are relatively slight their repetition weakens the fittings and in time cause leakage. In tanks utilized for this purpose and other tanks where the bushing served as a substantially permanent connection between a pipe and the tank wall, it has been found more economical to provide bushings which could be secured in position without welding, namely, a bushing having a flange at one end and engaging one side of the metal walls and a collar or neck tapering toward its opposite end, which collar or neck was peened over into engagement with the opposite side of the wall. While this form of bushing and mounting may be used in many instances, it has been found to be unsatisfactory in tanks for holding a fluid under pressure and especially where expansion and contraction stresses were present, since the pressure combined with these stresses developed leakage around the bushing. To overcome this difficulty in bushings of this type, I have incorporated therein a form of construction and method of assembly wherein the tank wall and walls of the bushing are interlocked together in liquid tight sealed relation; that is, the flange of the bushing is formed inwardly of its periphery with a circumferential recess or cavity in which the tank wall is forced by the pressure applied to the collar or neck in peening the latter, so that without the use of a gasket and by means of a press operation, I am enabled to mount in a sheet metal wall a bushing having a rigidly sealed, interlocking relation between it and the wall.

One object of the invention is to provide an improved bushing and mounting therefor in a container or tank wall capable of forming a rigid, sealed connection between the bushing and wall.

Another object of the invention is to provide an improved process of mounting bushings in tank walls whereby the bushings are interlocked to the walls and sealed to prevent leakage.

Another object of the invention is to provide in a container wall an improved bushing and mounting therefor wherein portions of the wall and bushing are interlocked to form a sealed joint and to incorporate with these portions means to prevent rotative movement of the bushing relative to the container wall.

Other objects of the invention will be apparent to those skilled in the art to which my invention relates from the following description taken in connection with the accompanying drawings, wherein Fig. 1 is a fragmentary elevation of a tank in which is mounted two bushings each embodying my invention.

Figure 1:

In the drawings, 1 indicates a tank which may be of any suitable construction, for holding a fluid. The tank shown for illustrative purposes consists of a storage tank for hot water, forming part of a hot water service system, the tank having an inlet pipe 2 for cold water leading from the city mains and an outlet pipe 3 for hot water leading to points of discharge. Each pipe 2, 3, is threaded into a bushing indicated as an entirety at 4, constructed and mounted in the wall 1a of the tank as hereinafter set forth. It will be understood that either or both pipes 2, 3, may be mounted in the side wall of the tank 1; likewise the tank may be provided with other bushings for a relief valve, drain pipe and pipes leading to and from the heating means (not shown) where the latter is not incorporated with the tank.

The bushing 4 preferably consists of a forging shaped to form an annular body portion 5, which is surrounded by a flange 6 and having a neck or collar 7 extending from the body portion on that side adjacent the face of the flange 6. The inner circumferential wall 7a of the neck 7 from the body portion 5 to its free end is inclined outwardly relative to the axis of the bushing so that it may be readily peened laterally as later set forth. The outer circumferential wall of the neck 7 from the flange 6 to its free end is inclined slightly inwardly relatively to the axis of the bushing to facilitate insertion of the neck 7 through the opening 1b in the tank wall 1a and the positioning of the latter against the flange 6.

Figures 2, 4:
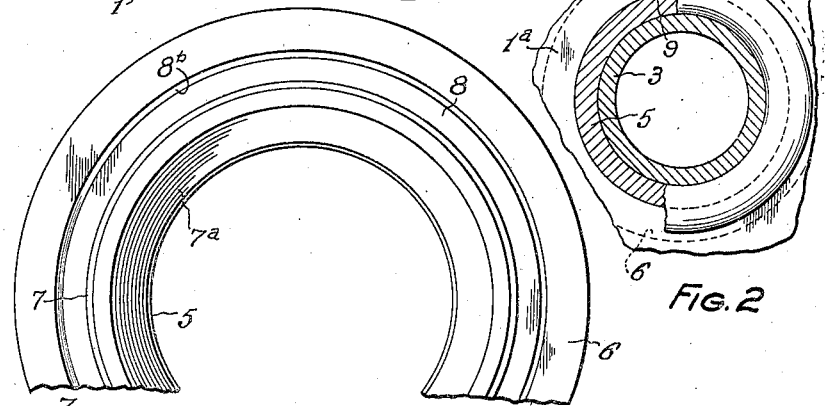
Fig. 2 is a fragmentary section on the line 2—2 of Fig. 1.
Fig. 4 is a fragmentary plan view of the bushing.
Figure 3:
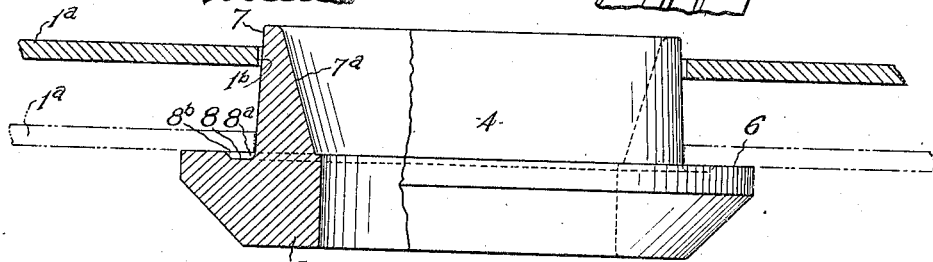
Fig. 3 is a fragmentary view, partly in section illustrating the preliminary steps of mounting a bushing in a tank wall.

It will be understood that the bushing 4 may be mounted in the wall 1a in either position, that is, with the flange 6 engaging the outer side of the wall or its inner side, the latter arrangement being chosen for illustration. The flange 6 is formed with a recess 8 surrounding the neck 7 and adjacent thereto, the bottom wall of the recess being connected to the outer wall of the neck by a short radius as shown at 8a; whereas the outer wall of the recess is inclined upwardly and outwardly at substantially a 45° angle and forms with the face of the flange a relatively sharp angled shoulder 8b. The opening 1b in the tank wall 1a has a predetermined diameter which permits the walls of the opening to closely fit the lower portion of the outer wall of the neck 7, when carrying out the step of assembling the bushing 4 with the wall 1a, as shown in dotted lines in Fig. 2.

Figure 5:
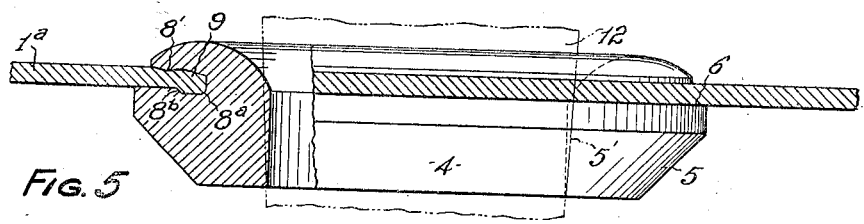
Fig. 5 is a fragmentary view, partly in section, with the tank and bushing in assembled relation.
Figure 6:
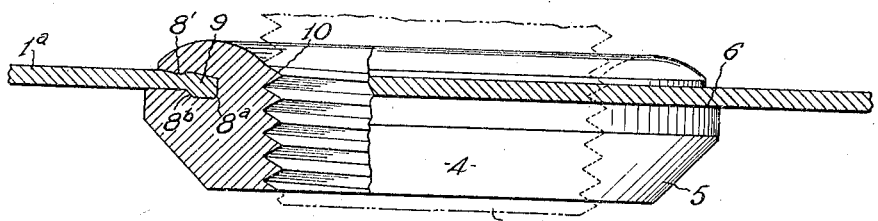
Fig. 6 is a view similar to Fig. 5, but showing the bushing internally threaded.
Figure 7:
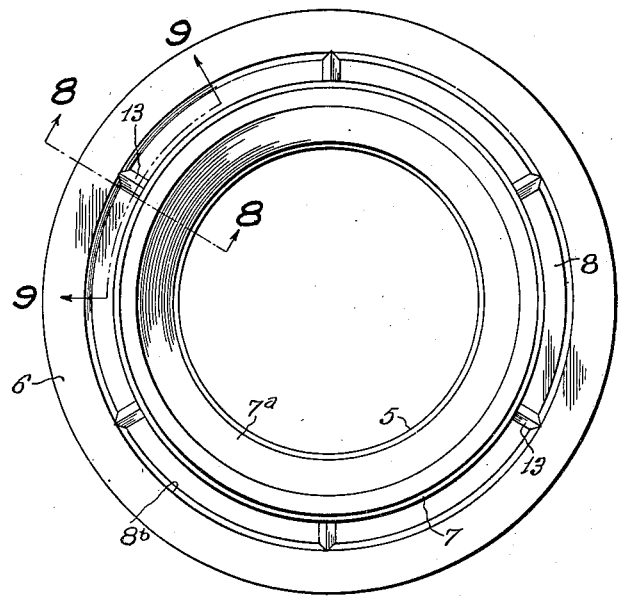
Fig. 7 is a plan view showing a modified form of bushing.
Figure 8:
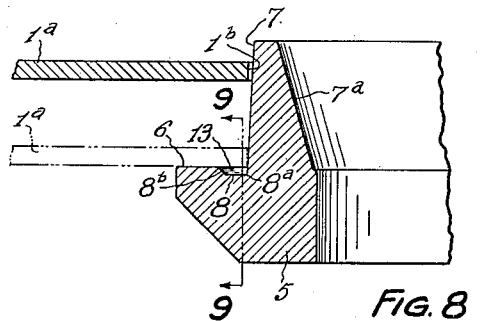
Fig. 8 is a fragmentary section, being a section on the line 8—8 of Fig. 7 and showing the preliminary step of mounting the bushing in a wall.
Figure 9:
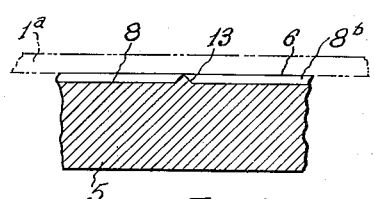
Fig. 9 is a fragmentary section on the line 9—9 of Figs. 7 and 8.
Figure 10:
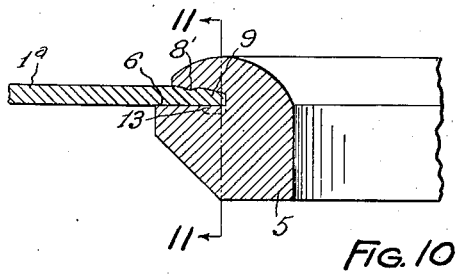
Fig. 10 is a fragmentary section showing the parts in assembled relation.
Figure 11:
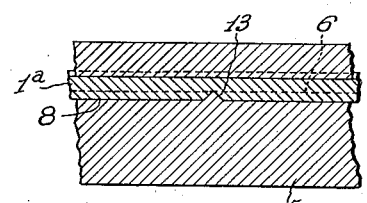
Fig. 11 is a fragmentary section on the line 11—11 of Fig. 10.

Next, the bushing 4 and wall 1a in their assembled relation are positioned in a suitable press between suitable dies carried by the anvil and the reciprocating member of the press, so that in the downward movement of the reciprocating member the neck 7 is peened over to the position shown in Figs. 5 and 6, against the opposite side of the wall 1a. In this operation, due to the pressure exerted by dies in the down-stroke of the press reciprocating member, the shoulder 8b in co-acting relation to the opposite portion of the peened over neck serves to crimp or compress the metal of the wall on a circumferential line 8'. As the pressure of the dies is greater toward the outer circumferential portions of the flange and peened over neck, this compression of the metal causes that portion thereof inwardly of the shoulder 8b to flow towards the neck, but as the edge of the metal opening 1a is in abutting relation to the neck, such metal portion is caused to expand laterally into the recess 8 and under the inner portion of the peened over neck, as shown at 9, so that the wall becomes interlocked behind the shoulder and is forced under pressure into and fills the space between the peened over portion of the neck and walls of the recess and adjacent wall of the neck, to form a liquid-tight, sealed relation therewith.

Finally, screw threads 10 are tapped into the internal wall of the body portion 5, by a suitable tool indicated at 11 in dotted lines in Fig. 6. By preference, the body portion is provided with a tapered threaded internal wall, for which purpose such wall is first reamed out in any desired manner on the dotted line 5' (see Fig. 5) by a suitable tool 12 shown in dotted lines in Fig. 5.

In my construction of bushing mounting provision is made for crimping the metal wall adjacent to its marginal circumferential edge portion and causing such portion to flow inwardly, so that by positioning the side edge of the opening for the bushing against the bushing neck the metal of such edge portion is distorted or up-set to form on its opposite sides circumferential ribs, the rib on that side of the wall adjacent the flange being forced into the recess 8 and the peened over portion of the neck being forced over the rib of the opposite side, with the result that the up-set marginal edge is interlocked within the recess and between its walls and the peened over neck and all space filled with the up-set metal to insure a positive seal.

Figs. 7 to 11, illustrate a modified form of bushing and mounting wherein I provide within and throughout the recess 8 at uniformly spaced positions therein radially disposed inverted V-ribs 13 formed integrally with the walls of the recess when the bushing is forged, the recess and the ribs 13 being formed simultaneously with and as a part of the operation of forming the bushing. The ribs 13 project into the metal of the wall 1a due to the applied pressure between the press anvil and the press reciprocating member in the operation of peening the bushing collar or neck into its final position. As shown, the upper edges of the ribs 13 terminate in the plane of the face of the flange 6 and have a narrow width at their bases so as to form sharp upper or free edges for effecting indentation in the wall 1a without affecting the distortion or up-setting of the adjacent portions of the wall 1a to secure the interlock between it and the bushing. As the ribs extend to and are integral with the collar or neck 7, they do not prevent the assembly of the wall 1a and bushing with the side edge of the opening 1b in engagement with the bushing neck, so that the latter may act as an abutment for the wall to up-set the metal thereof during the peening operation, as already described. As the ribs 13 are forced into the wall 1a in and as a result of the peening step, the wall and bushing are locked together to resist turning of the bushing when a pipe or other device is screwed into the bushing or unscrewed therefrom, so that the rotative stresses are not at any time imparted to those portions of the bushing and wall which seal the joint between them, it being desirable to eliminate any strains which would affect the relation of these sealed together portions.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. The herein disclosed process of preparing tank walls which consists in forming a bushing consisting of an annular body portion having a neck extending from one end thereof and surrounded by a flange formed with spaced recesses in end to end relation adjacent to and concentrically related to said neck and an annular wall-engaging surface around said recesses and inverted substantially V-shaped members between adjoining end walls of said recesses, then in providing the tank wall and forming therein an opening the circumferential edge of which engagingly fits the said neck, then in inserting the said neck through said opening to engage said annular surface with one side of the tank wall, then applying pressure to the neck to peen that portion theerof outwardly of the tank wall over onto its other side and compressing the wall between the peened over portion and said annular surface, whereby that portion of the wall inwardly of said compressed portion of said wall is distorted under pressure within said recesses and under said peened-over neck portion with the V-shaped members compressed into said wall, to form a sealed interlocked relation between the tank wall and bushing.

2. A container having a sheet metal wall formed with an opening, a bushing comprising a body portion provided with a circumferential flange in engagement with one side of said wall and a neck extending through said opening, said flange being formed adjacent said neck with recesses concentric thereto and in spaced end to end relation, the outer end portion of said neck being swaged over into engagement with the opposite side of said wall opposite said flange and serving to bend the marginal edge portion thereof around said opening into said recesses to seal the joint between said wall and bushing, each wall between adjoining recesses comprising a radially disposed inverted V-rib arranged to project into the metal of said marginal edge portion to prevent rotative movement of the bushing relative to said wall.

3. An assembly comprising a sheet metal wall formed with an opening and a bushing comprising a body portion provided with a neck and a circumferential flange formed with a series of spaced recesses in end to end relation adjacent to and in concentrical relation to said neck and an annular surface outwardly of said recesses in engagement with one side of said wall, the marginal edge portion of said wall surrounding said opening therein being seated in said recesses and the neck extending through said opening and its outer annular portions swaged over onto the other side of said wall in opposed relation to said annular surface and bottom walls of said recesses to seal the wall therein, and the metal between the end walls of adjoining recesses having a subtsantially inverted V-shape and pressed into the metal of said sheet metal wall.

JOHN B. MEEK.